(12) United States Patent
Wang et al.

(10) Patent No.: US 8,474,556 B2
(45) Date of Patent: Jul. 2, 2013

(54) HYBRID POWER OUTPUT SYSTEM

(75) Inventors: Chuanfu Wang, Shenzhen (CN);
Hongbin Luo, Shenzhen (CN);
Xuguang Zhou, Shenzhen (CN);
Huanguang Chen, Shenzhen (CN);
Xiaohua Tang, Shenzhen (CN);
Youchuan Song, Shenzhen (CN)

(73) Assignee: BYD Co. Ltd., Shenzhen (CN)

( * ) Notice: Subject to any disclaimer, the term of this patent is extended or adjusted under 35 U.S.C. 154(b) by 545 days.

(21) Appl. No.: 12/521,059

(22) PCT Filed: Dec. 21, 2007
(Under 37 CFR 1.47)

(86) PCT No.: PCT/CN2007/071297
§ 371 (c)(1),
(2), (4) Date: Jun. 24, 2009

(87) PCT Pub. No.: WO2008/077345
PCT Pub. Date: Jul. 3, 2008

(65) Prior Publication Data
US 2010/0181125 A1    Jul. 22, 2010

(30) Foreign Application Priority Data
Dec. 25, 2006    (CN) .......................... 2006 1 0157726

(51) Int. Cl.
*B60K 6/42*    (2007.10)
(52) U.S. Cl.
USPC ................. 180/65.22; 180/65.285; 903/946
(58) Field of Classification Search
USPC .............................. 180/65.25, 65.265, 65.285
See application file for complete search history.

(56) References Cited

U.S. PATENT DOCUMENTS

| | | | |
|---|---|---|---|
| 5,599,203 A | 2/1997 | Broschard, III | |
| 5,845,731 A | 12/1998 | Buglione et al. | |
| 6,048,289 A * | 4/2000 | Hattori et al. | 477/15 |
| 6,053,842 A * | 4/2000 | Kitada et al. | 477/5 |
| 6,083,139 A * | 7/2000 | Deguchi et al. | 477/5 |
| 6,118,237 A * | 9/2000 | Kikuchi et al. | 318/139 |

(Continued)

FOREIGN PATENT DOCUMENTS

| | | |
|---|---|---|
| CN | 1200824 | 5/2005 |
| FR | 2809352 | 11/2001 |
| JP | 2002-166736 | 6/2002 |

OTHER PUBLICATIONS

International Search Report dated Feb. 1, 2008 issued in related PCT Application, International Publication No. WO 2008/077345.

*Primary Examiner* — Jeffrey J Restifo
(74) *Attorney, Agent, or Firm* — Brinks Hofer Gilson & Lione

(57) ABSTRACT

A hybrid power output system for outputting the power to the wheel driving shaft, including and engine, a first motor, a second motor, a third motor, a battery, a first clutch, a second clutch, and a third clutch, wherein the first motor and the second motor are connected electrically with the battery, and the third motor is connected electrically with the battery or another battery; the engine is connected to the first motor via the first clutch, and connected to the third motor via the third clutch; the first motor is connected to the second motor via the second clutch, and the second motor is connected to a wheel driving shaft. The hybrid power output system can reduce the response time of the vehicle, perfect power performance, save space, and reduce cost as well.

19 Claims, 10 Drawing Sheets

U.S. PATENT DOCUMENTS

| | | | |
|---|---|---|---|
| 6,296,593 B1* | 10/2001 | Gotou et al. | 477/176 |
| 6,450,275 B1* | 9/2002 | Gabriel et al. | 180/65.23 |
| 6,566,826 B2* | 5/2003 | Imai et al. | 318/11 |
| 6,668,953 B1* | 12/2003 | Reik et al. | 180/53.8 |
| 6,705,416 B1 | 3/2004 | Glonner et al. | |
| 7,053,566 B2* | 5/2006 | Aizawa et al. | 318/34 |
| 7,341,535 B2* | 3/2008 | Usoro | 475/5 |
| 7,344,464 B2* | 3/2008 | Usoro | 475/5 |
| 7,371,201 B2* | 5/2008 | Usoro | 475/5 |
| 7,371,202 B2* | 5/2008 | Usoro | 475/5 |
| 7,395,889 B2* | 7/2008 | Sugiyama et al. | 180/65.285 |
| 7,422,534 B2* | 9/2008 | Usoro | 475/5 |
| 7,468,014 B2* | 12/2008 | Usoro | 475/5 |
| 7,479,080 B2* | 1/2009 | Usoro | 475/5 |
| 7,479,082 B2* | 1/2009 | Usoro | 475/5 |
| 7,481,731 B2* | 1/2009 | Usoro | 475/5 |
| 7,494,436 B2* | 2/2009 | Usoro | 475/5 |
| 7,507,173 B2* | 3/2009 | Usoro | 475/5 |
| 7,625,307 B2* | 12/2009 | Usoro | 475/5 |
| 7,704,176 B2* | 4/2010 | Holmes | 475/5 |
| 7,748,482 B2* | 7/2010 | Holmes et al. | 180/65.22 |
| 2002/0084118 A1 | 7/2002 | Esaki | |
| 2004/0058769 A1 | 3/2004 | Larkin | |

\* cited by examiner

HYBRID POWER OUTPUT SYSTEM

CROSS-REFERENCE TO RELATED APPLICATIONS

This application is a national phase application of PCT Application No. PCT/CN2007/071297, filed Dec. 21, 2007, which claims priority from Chinese Patent Application No. 2006-10157726.1, filed Dec. 25, 2006, both contents of which are incorporated herein by reference in their entirety.

TECHNICAL FIELD

The present invention relates to a hybrid power output system, and more particularly to a hybrid power system for outputting the power to the wheel driving shaft to propel the vehicle.

BACKGROUND

The hybrid vehicle generally has two different power sources simultaneously. According to the various connection types, it may be mainly divided into three structures of series hybrid, parallel hybrid and series-parallel hybrid.

The series hybrid is characterized in electrically coupled, wherein the engine directly drives an electric generator for charging the battery, and then an electric motor is operated by electrical energy from the battery to drive the wheels. The parallel hybrid is characterized in mechanically coupled, wherein the engine is connected with the driving shaft, and the motor can be selectively operated as an electric motor or a electric generator for balancing the loads of the engine.

In the prior art, one of the series-parallel hybrid may use a planetary gear unit to realize the distribution of power among the driving units. In this structure, the engine may be connected to the carrier of the planetary gear unit, a part of the power of the engine is transferred into the electrical energy by means of the first motor for furnishing the electrical energy to the second motor or for charging the battery, and the other part of the power of the engine is directly transmitted to the ring gear of the planetary gear unit; meanwhile, the second motor is connected with the ring gear for the supply of some supplementary power or torque. In this structure, a part of the power output from the engine is always used to power the first motor to generate the electrical energy for charging the battery or for driving the second motor.

In the prior art, a series-parallel hybrid may use the clutch to realize the power distribution among the driving units. For example, the Chinese patent CN 1200824 C discloses a hybrid power drive system for propelling the vehicle, which comprises two clutches, two motors and a battery, wherein the first clutch and the second clutch are respectively disposed between the first motor, the second motor and the internal combustion engine, the second motor is permanently connected to a variable-ratio transmission, and the first motor and the second motor are connected electrically with the battery. As it can be seen from the disclosure, the first motor of the drive system has three functions as below: (1) starting motor for the internal combustion engine; (2) generator for outputting electrical energy; and (3) drive device for driving the transmission hydraulic pump and other auxiliaries such as an air conditioner compressor, a power steering pump. Thus it can be seen that, the first motor is equal to a starting motor (with lower power or capacity) for the internal combustion engine in a conventional vehicle, except that it is electrically connected with the battery, and under control, it has some other functions besides to start the internal combustion engine, for example, to drive some auxiliaries. The Chinese patent CN 1200824 C also discloses that, during the vehicle is propelled by the second motor, when a greater traction torque is needed, the engine can be started by the first motor independent from the second motor, and then the engine and the second motor together propel the vehicle. In this case, the structure reduces, at some extent, the response time for vehicle acceleration. However, due to the limitation in function and design of the first motor, the first motor can't be operated for driving the wheels alone, and unsuitable for driving the wheels together with the second motor. Therefore, when a rapid acceleration from rest is required for the vehicle, the second motor will be operated for propelling the vehicle alone before the engine is started. Because the power of the second motor is relatively small, the acceleration property is limited during this period, and the acceleration time will be longer. Furthermore, the drive system can't provide more driving modes, and can't provide optimum power output under various driving conditions.

SUMMARY OF THE INVENTION

Accordingly, an object of the present invention is to provide a hybrid power output system, which can effectively reduce the response time for vehicle acceleration, and have excellent power performance.

Another object of the present invention is to provide a hybrid power output system, which can realize multiple driving modes so as to enhance the power efficiency and reduce the fuel consumption.

In order to achieve the main object mentioned above, according to the present invention, a hybrid power output system is provided, which comprises an engine, a first motor, a second motor, a third motor, a battery, a first clutch, a second clutch and a third clutch, wherein the first motor and the second motor are connected electrically with the battery, and the third motor is connected electrically with the battery or another battery; the engine is connected to the first motor via the first clutch, and connected to the third motor via the third clutch; the first motor is connected to the second motor via the second clutch, and the second motor is connected to a wheel driving shaft.

According to the hybrid power output system as above, the first motor and the second motor have excellent power output performance. When a rapid acceleration is required, the first motor and the second motor can be operated together for driving the wheels to provide sufficient torque and power for the vehicle. When the vehicle is accelerated up to a relatively high speed (for example 60 km/hour), and a higher torque is required, the third clutch can be engaged and the engine can be started using the third motor. When the rotary speed of the engine is up to or close to the rotary speed of the first motor, the first clutch is engaged, and then the vehicle can be propelled by the engine, the first motor and the second motor together, as a result, the power is increased, and the response time for acceleration is further reduced.

Preferably, the engine, the first clutch, the first motor, the second clutch, and the second motor may be connected or arranged in sequence and coaxially. The third clutch and the third motor may be disposed on a branch between the engine and the first clutch.

In this arrangement, the output shaft of the engine is arranged coaxially with the rotary shafts of the first motor and the second motor, and mechanically connected via the first clutch and the second clutch. The third clutch and the third motor may be disposed on a branch between the engine and the first clutch. Thus, the driving units of the power output system may be compactly arranged on the vehicle, and be easier to be integrated or installed. Furthermore, since all the driving units are coaxial, no special means is required for transmissions of mechanical energy (such as gear systems among the different rotating shafts), and the loss of energy during transmission is minimized, and therefore the efficiency of the power output system is increased.

In the present invention, the first motor and the second motor are connected electrically to the battery (also referred to power battery). The third motor, as required, can be connected electrically to: (a) the battery, and can be operated for starting the engine, charging the battery, or participating in driving the wheels; (b) another battery, such as a secondary battery, having a lower voltage (e.g. 12V), and is specialized for starting the engine.

In the present invention, when the third motor is connected electrically to the secondary battery, it is used only for starting the engine while the third clutch is engaged. When the engine is started and output power, the third clutch is disengaged, and the power can be output from the engine maximally. When the third motor is connected electrically to the power battery, it can be functioned as a starting motor for the engine, or as a generator, or as a driving motor for participating in driving the wheels and, as a result, the vehicle has a stronger power.

In the present invention, the first motor and the second motor each can be used to propel the vehicle alone, and both can be used to propel the vehicle together. As for various driving conditions of the vehicle, the first motor and the second motor can be operated at the highest efficiency, such that the hybrid output system can realize multiple driving modes, so as to optimize the power transmission efficiency and reduce the fuel consumption.

Preferably, the first motor may be designed as a mid-speed or high-speed motor, while the second motor may be designed as a mid-speed or low-speed motor.

The first motor is designed as a mid-speed or high speed motor, that is, its efficiency at a high rotary speed is higher than that at a low rotary speed. The second motor is designed as a mid-speed or low-speed motor, that is, its efficiency at a low rotary speed is higher than that at a high rotary speed. Thus, the first motor and the second motor can meet the requirements of the wheels for torque and rotary speed by cooperating at the optimum efficiency. Moreover, the design difficulties (the difficulties for designing a motor which has a high efficiency at full speeds including the low-speed, mid-speed and high-speed) for both motors can be reduced.

Thus, the first motor and the second motor can be cooperated to drive the wheels, and each can be worked in a higher efficiency, such that the efficiency of the whole drive system can be increased substantially. For example, when the vehicle is started from the rest or is traveling at a low speed, the higher efficient second motor may be operated to drive the wheels alone; when the speed is up to a specified value at which the first motor can work at a higher efficiency, the first motor may be operated to drive the wheels alone; and when the speed is moderate, the first and the second motors may be cooperated at a higher efficiency for driving the wheels together. If a higher traction torque is required, the first and the second motors can be operated to drive the wheels together. Since both motors can be operated to drive the wheels together to furnish a higher torque, the two motors may be designed relatively smaller, such that the whole power output system can be arranged on the vehicle more easily and compactly.

Thus, during such a purely electrical operation, the power output system will also have an excellent power output capacity to meet the requirements for propelling the vehicle, even though the internal combustion engine is not started. Thus, the fuel consumption and pollutant emission is minimized.

Furthermore, it may be designed that, the power of the second motor is greater than that of the first motor, and the power of the third motor is smaller than or close to that of the first motor. When the second motor is operated for propelling the vehicle from the rest, a higher torque is required, therefore the power of the second motor is designed to be greater than that of the first motor. Since the third motor is required to start the engine alone, the power of the third motor can not be too small, therefore, its power should be a little smaller than or close to that of the first motor.

Furthermore, the second motor can be connected to the wheel driving shaft via a constant-mesh fixed ratio reduction unit. The fixed ratio reduction unit may be a constant-mesh gear-drive reduction unit, a constant-mesh chain-drive reduction unit or a constant-mesh friction-drive reduction unit. In such an arrangement, the power to the wheel driving shaft will not be interrupted due to change of shifts, and therefore the comfort of the vehicle can be improved. Moreover, since the operation and control for changing shifts is not required, the power output system is easier to be operated and controlled. Moreover, since it is not needed to leave a large space on the vehicle to install the large sized transmission, the space arrangement of the power output system can be optimized, and the cost also can be reduced.

The other features and advantages of the present invention will be further described below with reference to the attached drawings.

DETAILED DESCRIPTION OF CERTAIN INVENTIVE EMBODIMENTS

The embodiments of the present invention will now be described in detail with reference to the accompanying drawings.

Figure 1:
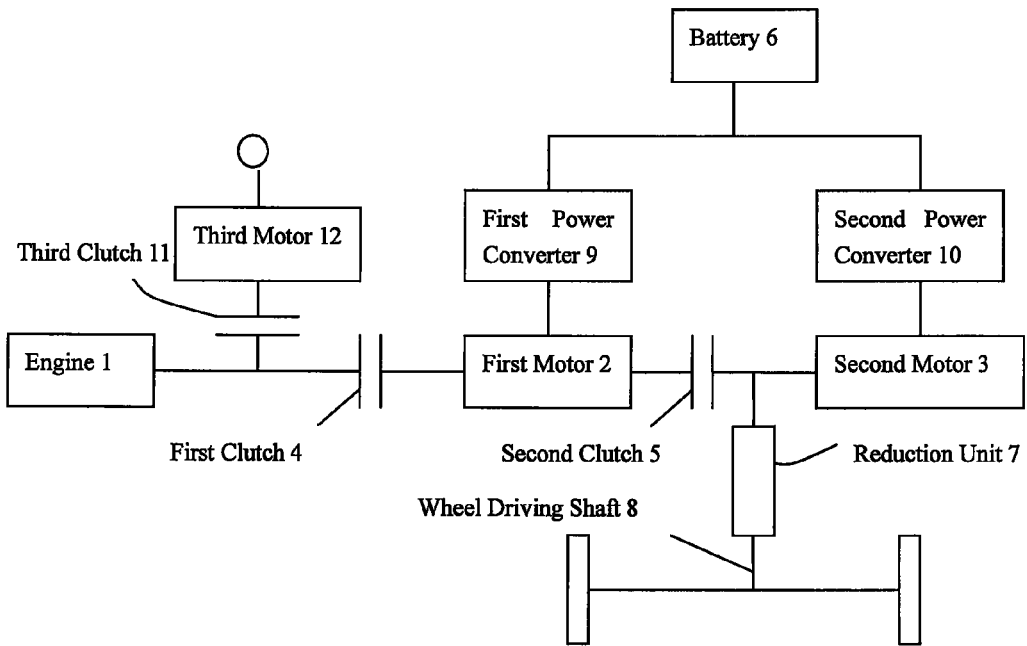
FIG. 1 is a schematic view illustrating a hybrid power output system of the present invention.

Referring to FIG. 1, it is a schematic view illustrating the hybrid power output system according to the present invention. The system is used to output the power to the wheel driving shaft and the wheels so as to propel the vehicle. This hybrid power output system comprises an engine 1, a first motor 2, a second motor 3, a third motor 12, a battery 6, a first clutch 4, a second clutch 5 and a third clutch 11, wherein the first motor 2 and the second motor 3 are connected electrically with the battery 6, and the third motor 12 is connected electrically with the battery 6 or another battery 14 (see FIG. 3); the engine 1 is connected to the first motor 2 via the first clutch 4, and connected to the third motor 12 via the third clutch 11; the first motor 2 is connected to the second motor 3 via the second clutch 5, and the second motor 3 is connected to the wheel driving shaft 8. In the embodiment as shown in FIG. 1, the second motor 3 is connected to the wheel driving shaft 8 via a fixed ratio reduction unit 7.

Preferably, the engine 1, the first clutch 4, the first motor 2, the second clutch 5, and the second motor 3 are connected in sequence and coaxially, that is, the rotating shafts of the first motor 2 and the second motor 3 are arranged coaxially with the output shaft of the engine 1. The output shaft of the engine 1 is connected with the rotating shaft of the first motor 2 via the first clutch 4, the rotating shaft of the first motor 2 is connected with the rotating shaft of the second motor 3 via the second clutch 5, and the wheel driving shaft 8 may be arranged between the second clutch 5 and the second motor 3.

Figure 2:
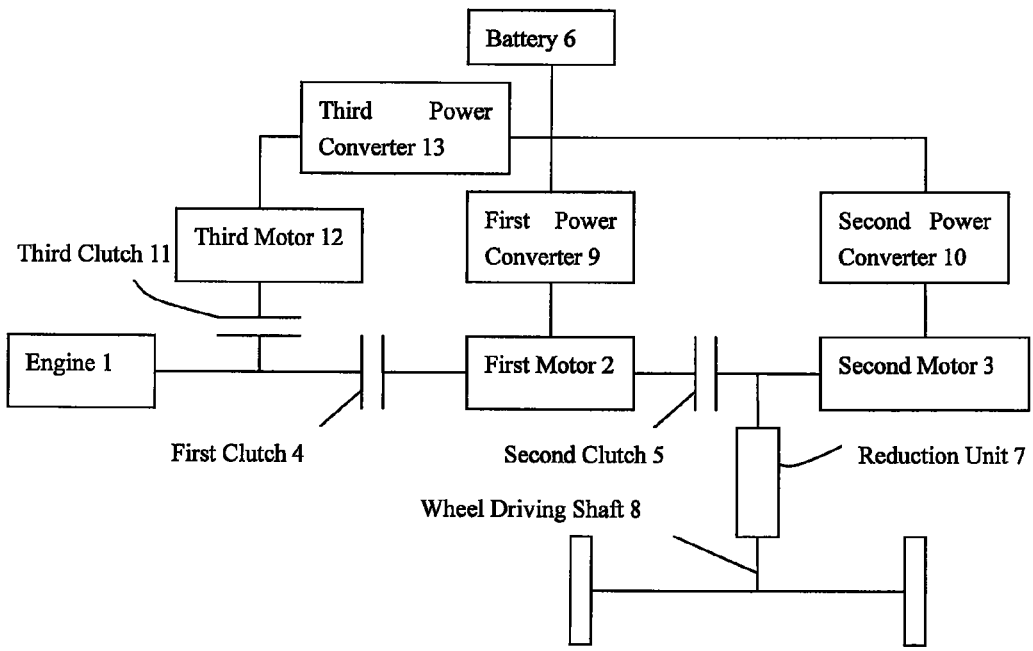
FIG. 2 is a schematic view illustrating a hybrid power output system according to an embodiment of the present invention.

Preferably, the first motor 2 and the second motor 3 are connected electrically to the power battery 6. The third motor 12, as required, can be connected electrically to: (a) the power battery 6, and can be operated for starting the engine 1, charging the power battery 6, or participating in driving the wheels, as shown in FIG. 2; (b) another battery such as a secondary battery 14 having a lower voltage (e.g. 12V), and is specialized for starting the engine 1 while the third clutch 11 is engaged, as shown in FIG. 3.

Referring to FIG. 2, the power battery 6 is a controllable energy storage unit, which may be, but not limited to, a lithium battery, an iron battery, a nickel-hydrogen battery, a nickel-chrome battery and so on. The first motor 2 and the second motor 3 may be respectively connected electrically with the power battery 6 through a first power converter 9 and a second power converter 10, and the third motor 12 may be connected electrically with the power battery 6 or another battery such as the secondary battery 14 through a third power converter 13. The first power converter 9, the second power converter 10 and the third power converter 13 may have the bi-directional power conversion, thus, through the conversion of power switching unit, the motors may convert the electrical energy stored in the power battery 6 into the power output, and the first motor 2 and the second motor 3 may also convert the power into the electrical energy for storing in the power battery 6. When the engine 1 is required to start, the third motor 12 is coupled with the output shaft of the engine 1 via the engaged third clutch 11, and receives electrical energy from the power battery 6 to produce adequate torque for starting the engine 1. When the power battery 6 is required to be recharged, the first motor 2 may also generate electrical energy to charge the battery 6 under the driving of the engine 1.

Figure 3:
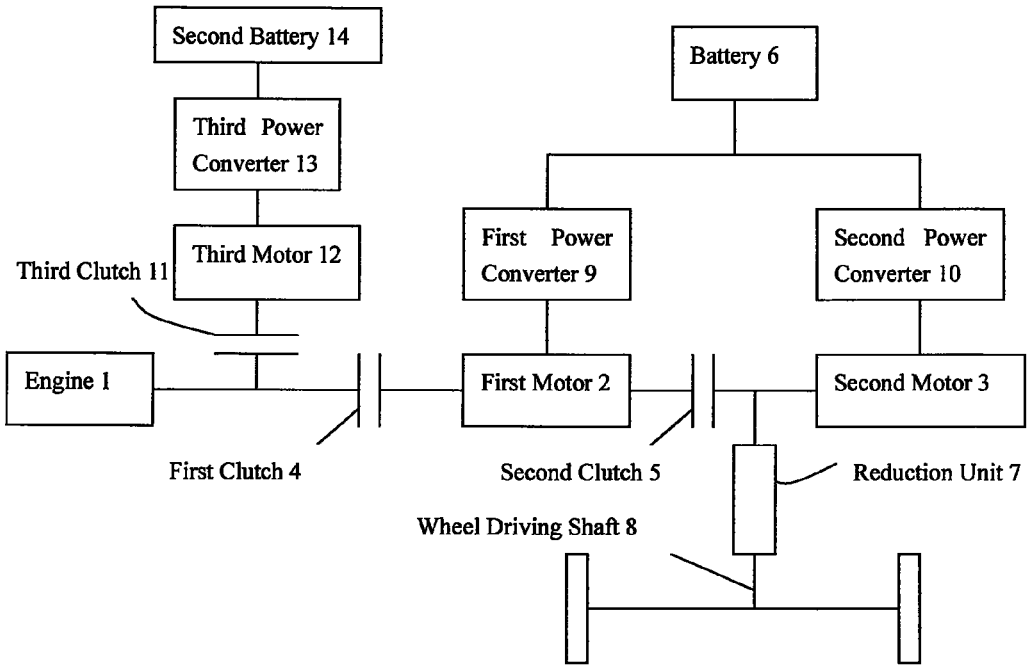
FIG. 3 is a schematic view illustrating a hybrid power output system according to another embodiment of the present invention.

Referring to FIG. 3, the power battery 6 is a controllable energy storage unit, which may be, but not limited to, a lithium battery, an iron battery, a nickel-hydrogen battery, a nickel-chrome battery and so on. The secondary battery 14 is an auxiliary energy storage unit on the vehicle, and may be a 12V lead-acid battery and the like. The first motor 2 and the second motor 3 may be respectively connected electrically with the power battery 6 through a first power converter 9 and a second power converter 10, and the third motor 12 may be connected electrically with the secondary battery 14 through a third power converter 13. In this embodiment, the third motor 12 has a smaller power, and can be used only to start the engine 1 while the third clutch 11 is engaged.

Referring to FIG. 1, the engine 1 can work using the fuel such as gasoline and diesel, and output the power through the wheel driving shaft 8.

The first motor 2 and the second motor 3 may be AC motors such as the permanent magnet synchronous motor. These two motors each can be functional as a generator for generating electricity or an electric motor for driving. The third motor 12 may be an AC motor or a DC motor. If the third motor 12 is an AC motor, it is powered by the power battery; if the third motor 12 is a DC motor, it is powered by the 12V lead-acid battery on vehicle.

The second motor 3 has the power higher than that of the first motor 2, and is mainly operated for driving the wheels alone in a purely electrical manner when the engine 1 is stopped. When the second motor 3 fails to furnish sufficient torque required by the wheels, the first motor 2 can be operated to drive the wheels together with the second motor in the purely electrical manner. Also, the first motor 2 can be used to drive the wheels alone in the purely electrical manner.

The third motor 12 has the power smaller than or equal to that of the first motor 2, and is used for starting the engine 1 while the third clutch 11 is engaged. The third motor 12 may be used to output power to the wheels in an electrical driving manner.

The higher efficiency range of the engine 1 is usually at the relatively high rotary speed. Thus, during the vehicle is accelerating from the rest to the relatively high speed, the motor is used for electrically propelling the vehicle, while the engine is not required for propelling. Therefore, the engine can be avoided to operate in a low efficiency range, which may cause high consumption of fuel and high emission of pollutants.

When the first motor 2 together with the second motor 3 are used for electrically propelling the vehicle, the third clutch 11 and the first clutch 4 are disengaged, while the second clutch 5 shall be switched to be engaged. The first motor 2 and the second motor 3 can be operated to be at a substantially same speed, and then the second clutch 5 is operated to engage. During the low speed condition of the vehicle, the first motor 2 and the second motor 3 are able to provide adequate torque to meet the requirement for heavy load of the vehicle, and the engine is not required for such a heavy load, and therefore the engine is avoided to work in a low efficiency range.

In the present invention, the fixed ratio reduction unit 7 may be placed between the second motor 3 and the second clutch 5, or placed on the other side of the second motor 3. Preferably, the fixed ratio reduction unit 7 is located between the second motor 3 and the second clutch 5, so as to meet the requirement for arrangement of the vehicle. The fixed ratio reduction unit may be but not limited to a constant-mesh gear-drive reduction unit, a constant-mesh chain-drive reduction unit or a constant-mesh friction-drive reduction unit, so long as the speed can be reduced and the reduction ratio is constant.

As shown in FIG. 1, the present invention may be operated in the modes of purely electrical energy operation, purely engine operation, series-hybrid operation, parallel-hybrid operation and series-parallel operation.

With reference to FIG. 4 to FIG. 15, the different operation modes of the present hybrid power output system will be described as below.

Figure 4:
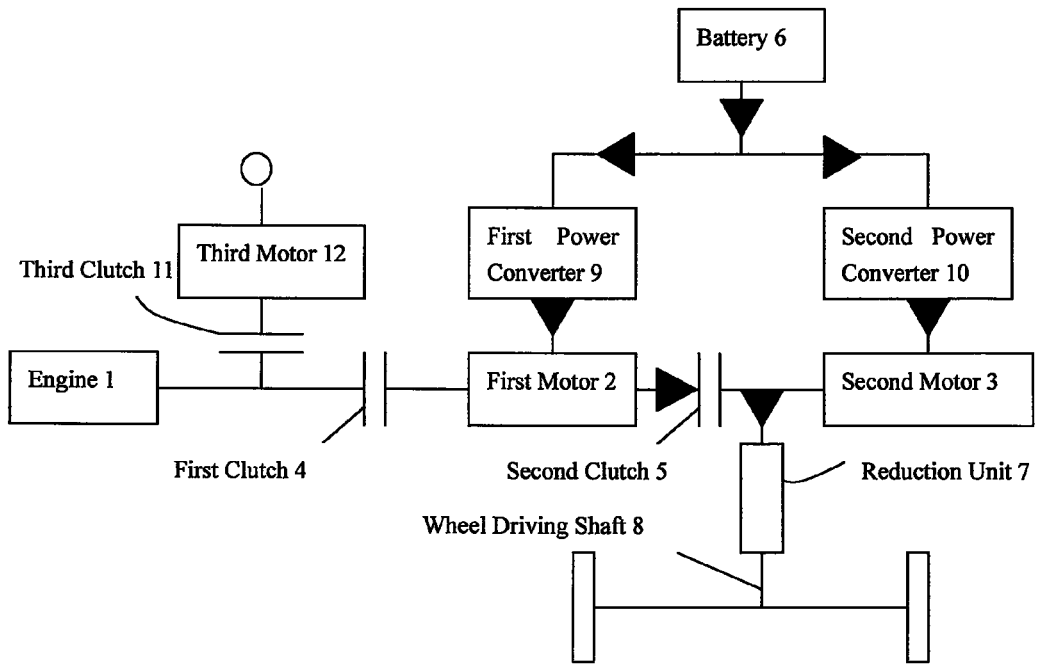
FIG. 4 to FIG. 15 are views illustrating the various power output modes of the present hybrid power output system.
Figure 5:
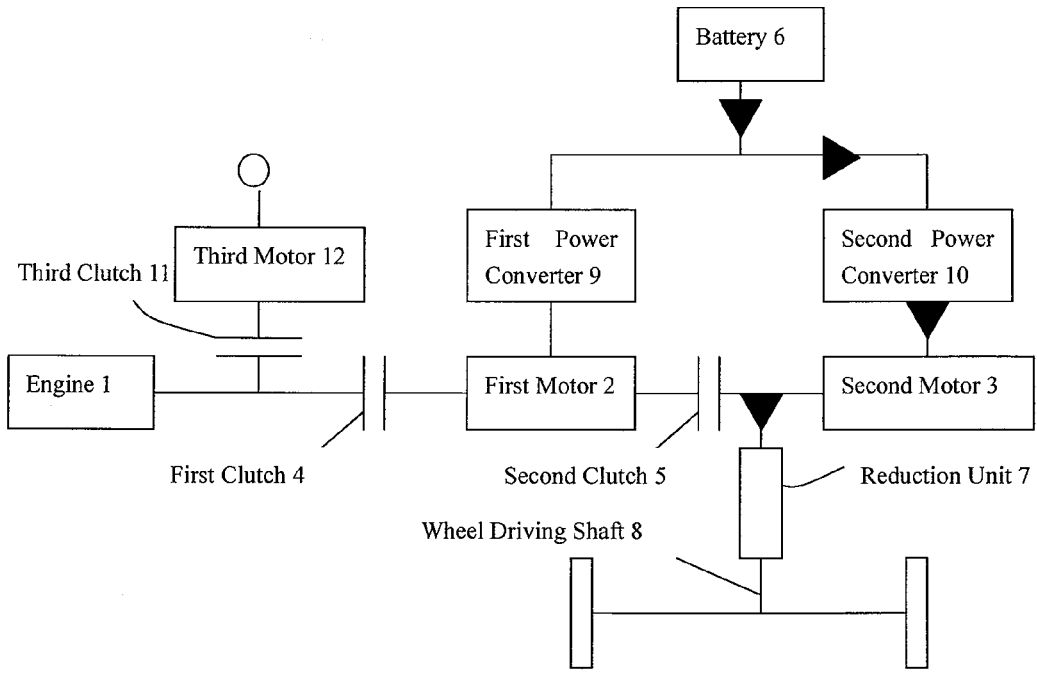
Figure 6:
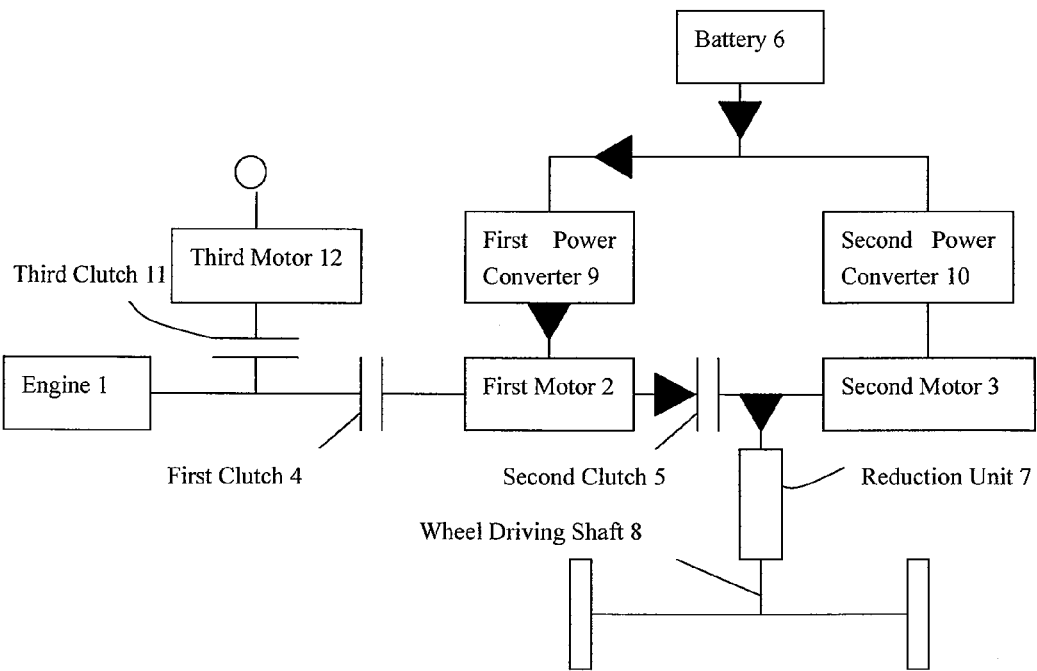

FIG. 4, FIG. 5 and FIG. 6 are the views illustrating that the driving shaft 8 is driven only based on the power output from the motor(s), which is the so-called purely electrical energy operation mode of the hybrid power system, that is, the engine 1 is stopped, only the motor is used for propelling the vehicle.

During this mode, the engine 1 is stopped, the first clutch 4 and the third clutch 11 are disengaged, and the power may be flowed in three different manners, as shown in FIG. 4, FIG. 5 and FIG. 6 respectively.

As shown in FIG. 4, it shows the operation mode in which both the first motor 2 and the second motor 3 are operated for propelling the driving shaft 8, at this time the second clutch 5 is engaged. Thus, the rotating shafts of both motors may simultaneously transfer the torque to the driving shaft 8; the first motor 2 and the second motor 3 work under the electrical energy operation mode, the battery 6 provides the electrical energy to both motors. As indicated by the arrow in FIG. 4, the battery 6 provides the electrical energy to the first motor 2 and the second motor 3, and then the latter may output the torque to the driving shaft 8.

As shown in FIG. 5, it shows the operation mode in which only the second motor 3 is operated to propelling the vehicle, at this time, the second clutch 5 is disengaged, the first motor 2 is stopped, the second motor 3 is operated under battery power, the battery 6 provides the electrical energy for the second motor 3. As indicated by the arrow in FIG. 5, the battery 6 provides the electrical energy to the second motor 3, and the second motor 3 output the torque to the driving shaft 8.

FIG. 6 shows the operation mode in which only the first motor 2 is operated to propelling the vehicle, at this time, the second clutch 5 is engaged, the second motor 3 is stopped or idle, the first motor 2 is operated under battery energy, the battery 6 provides the electrical energy for the first motor 2. As indicated by the arrow in FIG. 6, the battery 6 provides the electrical energy to the first motor 2, and the first motor 2 output the torque to the driving shaft 8.

Figure 7:
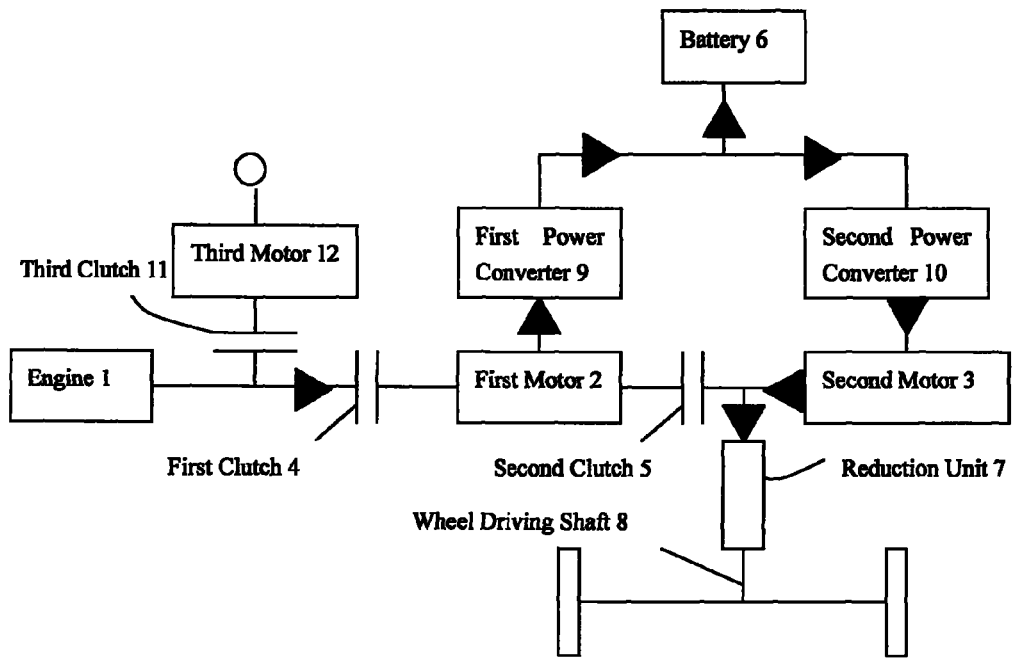
Figure 8:
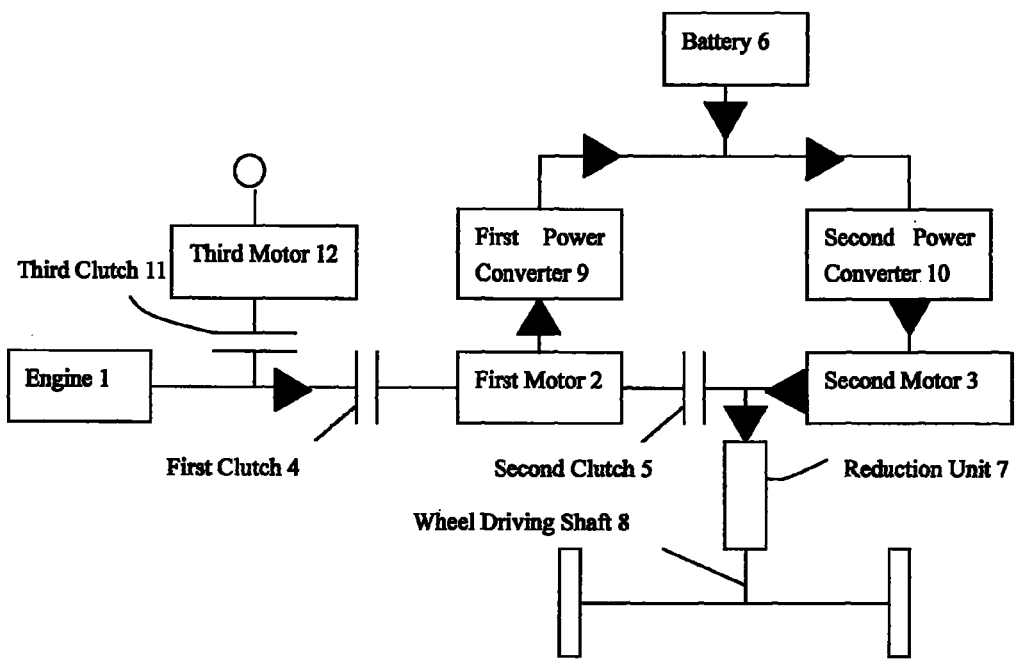

FIG. 7 and FIG. 8 show operation mode in which the engine 1 is operated, but the driving shaft 8 is only driven by the second motor 3, which is usually called as the series-hybrid operation mode.

During this mode, the second clutch 5 is disengaged, thus the mechanical connection between the first motor 2 (and the engine 1) and the driving shaft 8 is disconnected; the first clutch 4 is engaged, connecting the output shaft of the engine 1 with the rotating shaft of the first motor 2; the power from the engine 1 is transferred to the first motor 2, the first motor 2 is operated in the generating mode, the second motor 3 is operated in the electrical energy operation mode.

As indicated by the arrow in FIG. 7, when the battery 6 is required to be charged, partial electrical energy from the first motor 2 is used to charge the battery 6, while the remain is transferred to the second motor 3, the second motor 3 provides the torque to the driving shaft 8 through the fixed ratio reduction unit 7.

As indicated by the arrow in FIG. 8, the electrical energy from the first motor 2 is transferred to the second motor 3, the battery 6 also gives the electrical energy to the second motor 3, and the second motor 3 transfers the torque to the driving shaft 8.

Figure 9:
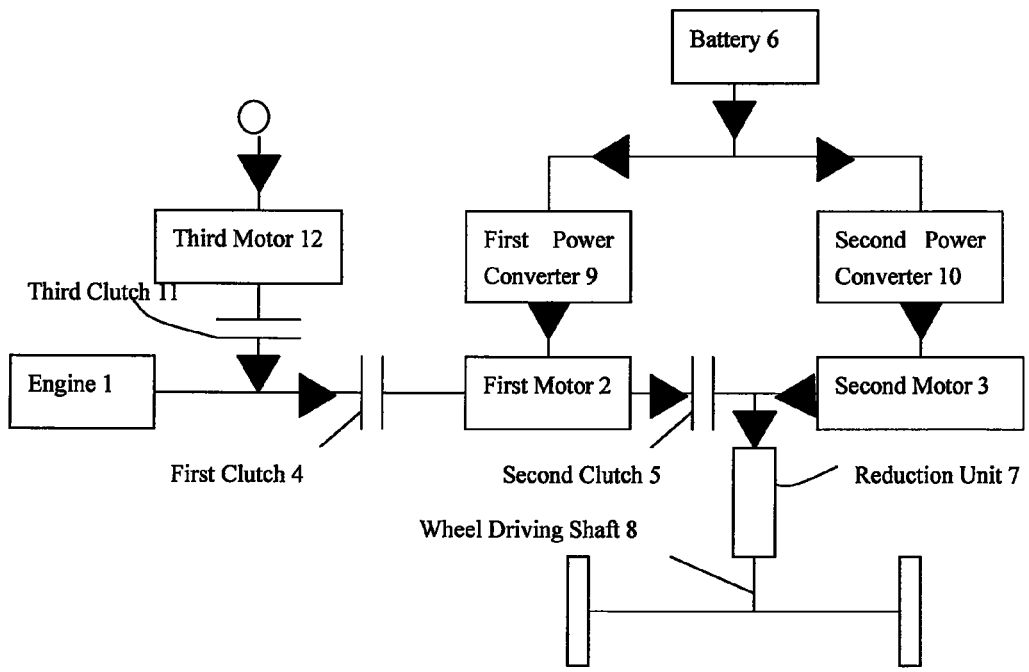
Figure 10:
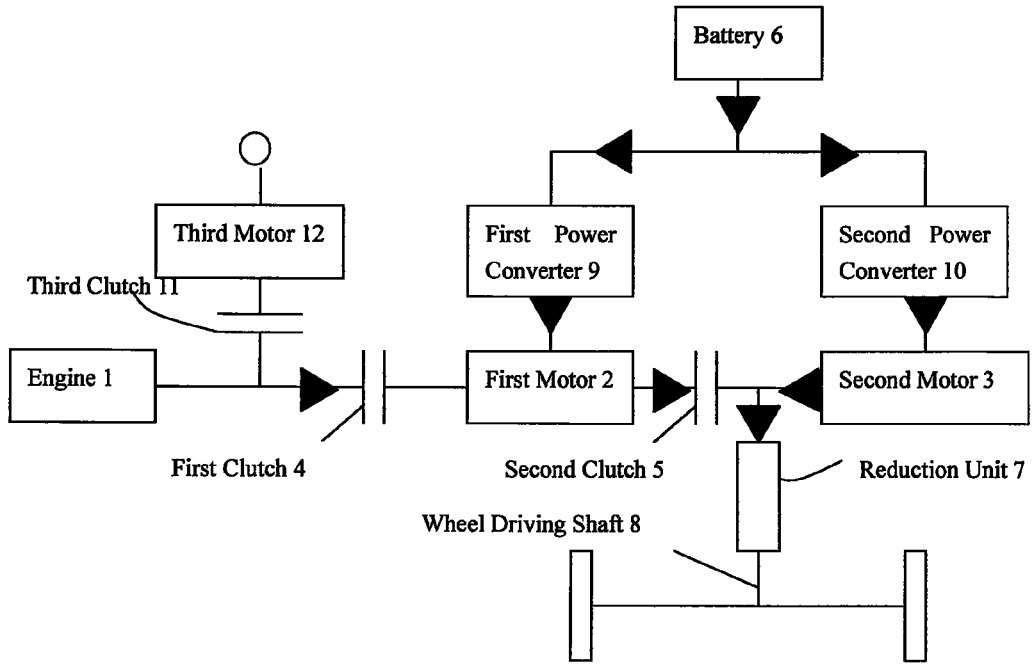
Figure 11:
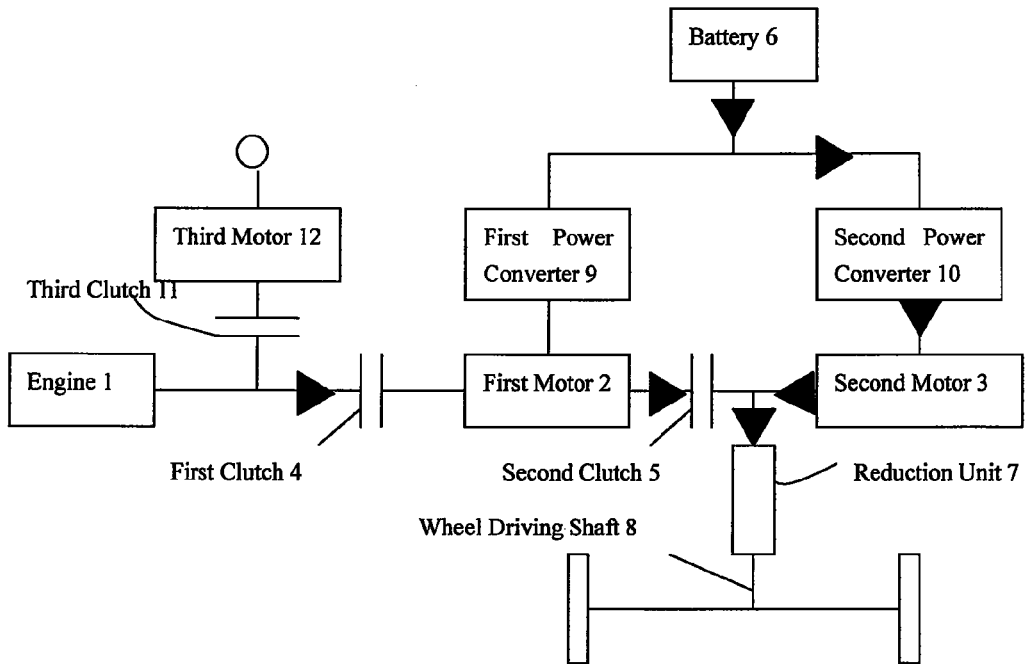

FIG. 9, FIG. 10 and FIG. 11 show the operation mode in which the engine 1 is used to propel the driving shaft 8, and at the same time, the electrical energy from the battery 6 is also consumed to produce the drive force to the driving shaft 8, which is usually called as the parallel-hybrid operation mode.

During this mode, both the first clutch 4 and the second clutch 5 are engaged, the third clutch 11 is engaged or disengaged, thus enable the output shaft of the engine 1 mechanically connected with the rotating shaft of the first motor 2, enable the first motor 2 and the second motor 3 mechanically connected with the driving shaft 8. According to the different operation modes of the first, the second and the third motors, the power can be flowed in different manners.

FIG. 9 shows the first power flow manner, wherein the first clutch 4, the second clutch 5 and the third clutch 11 are all engaged, and the first motor 2, the second motor 3 and the third motor 12 are all working under the battery energy; the battery 6 provides the required electrical energy for the three motors. As indicated by the arrow in FIG. 9, the engine 1 functions and transfers the torque to the driving shaft 8 through the rotating shaft of the first motor 2. According to the required drive torque, the first motor 2, the second motor 3 and the third motor 12 may convert the electrical energy from the battery 6, and output the torque to the driving shaft 8.

FIG. 10 shows the second power flow manner, wherein the third clutch 11 is disengaged, while the first clutch 4 and the second clutch 5 are engaged. The first motor 2 and the second motor 3 both operate under the battery energy; the battery 6 may provide the electrical energy as required. As indicated by the arrow in FIG. 10, the engine 1 functions to transmit the torque to the driving shaft 8 through the rotating shaft of the first motor 2. According to the drive torque as required, the first motor 2 and the second motor 3 may receive the electrical energy from the battery 6 to provide torque to the driving shaft 8.

FIG. 11 shows the third power flow manner, wherein the third clutch 11 is disengaged, while the first clutch 4 and the second clutch 5 are engaged. The first motor 2 is idle, and the second motor 3 operates under the battery energy; the battery 6 may provide the electrical energy as required. As indicated by the arrow in FIG. 11, the engine 1 functions to transmit the torque to the driving shaft 8 through the rotating shaft of the first motor 2. According to the drive torque as required, the second motor 3 may receive the electrical energy from the battery 6 to provide torque to the driving shaft 8.

Figure 12:
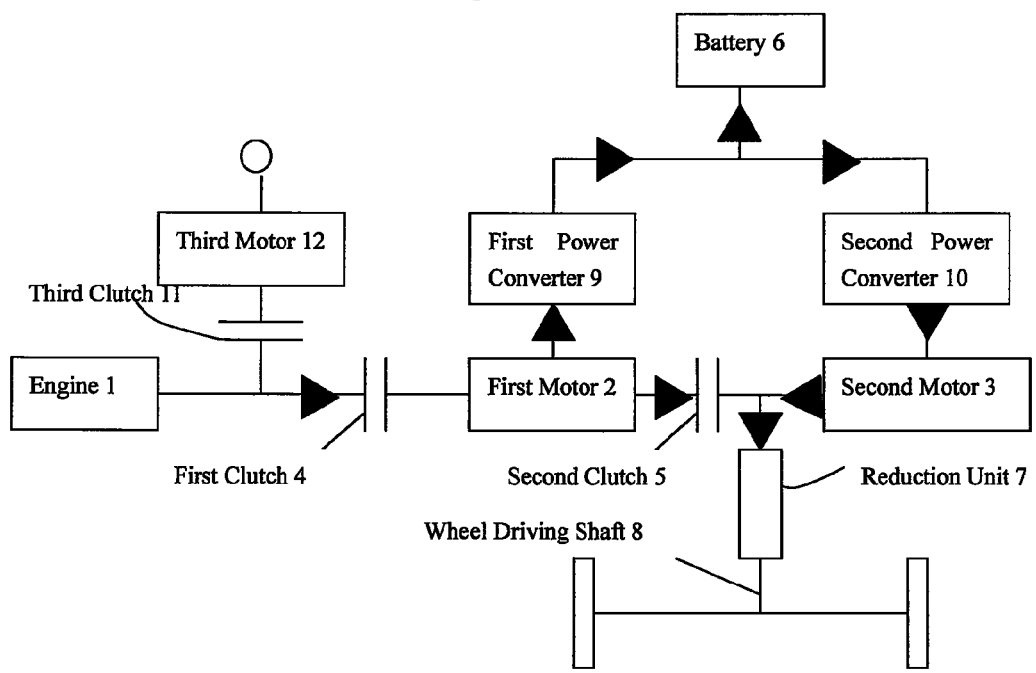
Figure 13:
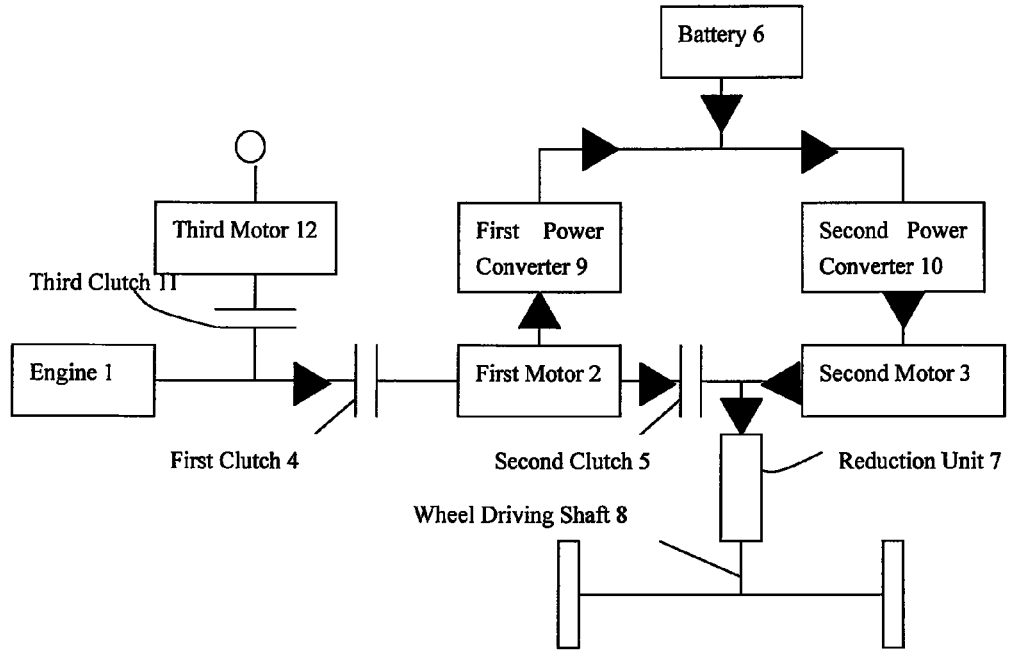

FIG. 12 and FIG. 13 show the operation mode in which the engine 1 output the power, the first motor 2 is generating the electricity, and the second motor 3 operates under the electrically driving mode, which is usually called as the series-parallel operation mode.

In this mode, partial power of the engine 1 is directly transferred to the driving shaft, the remain is used for driving the first motor 2 to work under the electricity-generating mode, and the second motor 3 is operating in the electrical energy mode.

As indicated by the arrow in FIG. 12, partial electrical energy generated by the first motor 2 is directly transferred to the second motor 3, enable the second motor 3 electrically drive the wheels, and the remain is charging the battery 6.

As indicated by the arrow in FIG. 13, the electrical energy generated by the first motor 2 is directly sent to the second motor 3, and the battery 6 also provides the electrical energy to the second motor 3, such that the second motor 3 electrically drive the wheels.

Figure 14:
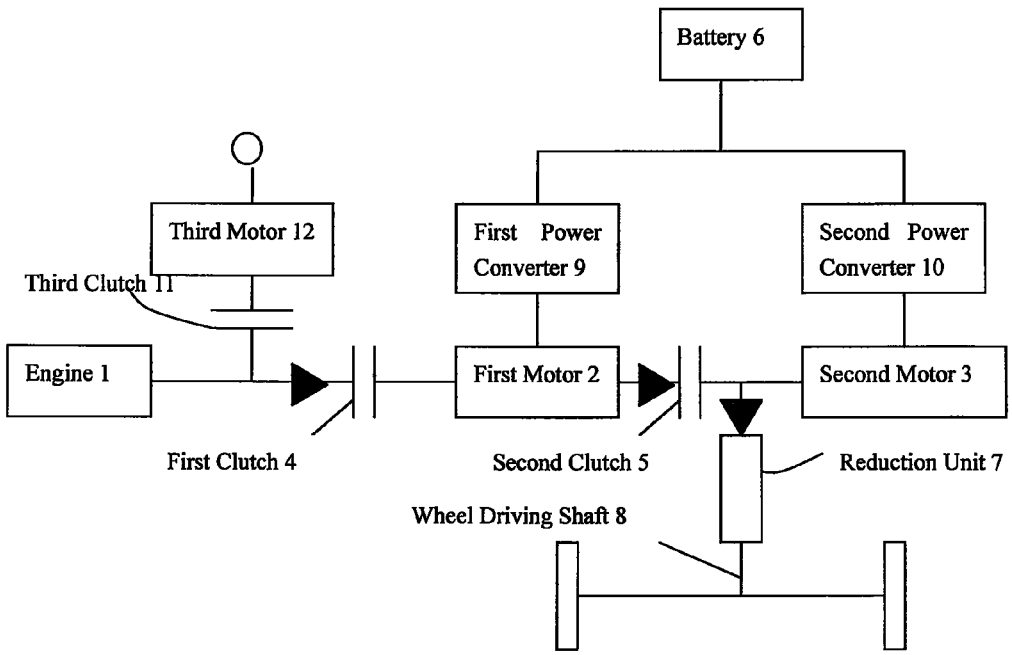
Figure 15:
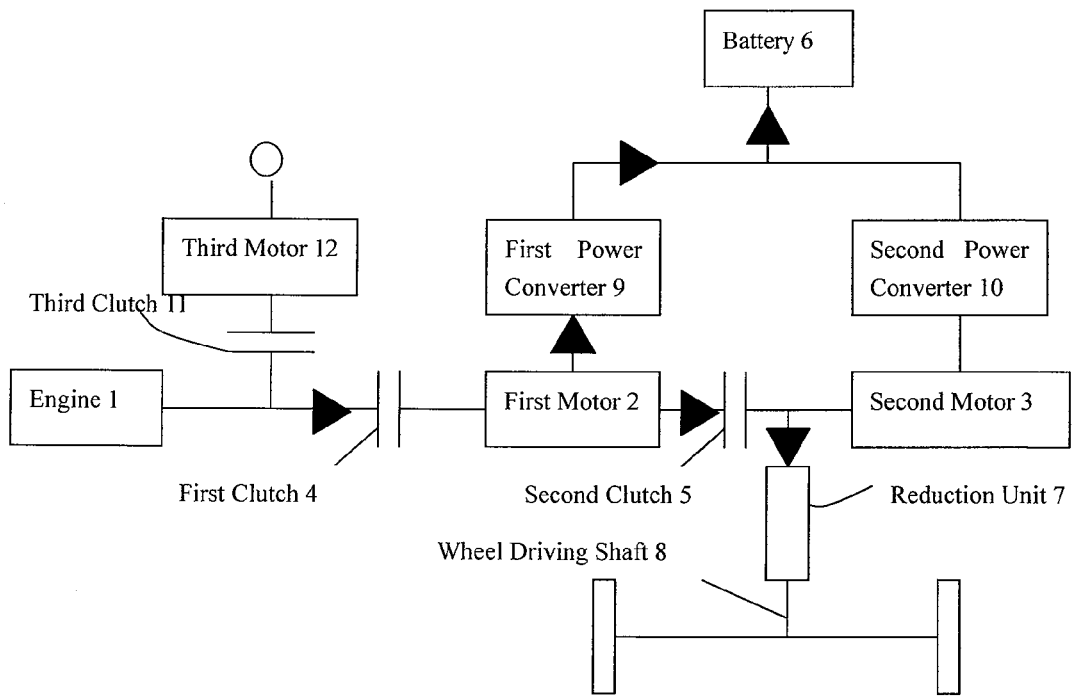

FIG. 14 and FIG. 15 show the operation mode in which the driving shaft 8 is only propelled by the engine 1, which is usually called as the purely engine operation mode, and at this time, both the first clutch 4 and the second clutch 5 are engaged, and the third clutch 11 is disengaged.

FIG. 14 shows the operation mode in which both the first motor 2 and the second motor 3 are idle, and their rotating shafts are used to transfer the torque from engine 1 to the driving shaft 8. As indicated by the arrow in FIG. 14, the engine 1 functions and transfers the torque to the driving shaft 8 through the rotating shafts of the first motor 2 and the second motor 3.

FIG. 15 shows the operation mode in which the first motor 2 transfers partial power from engine 1 into electrical energy for charging the battery 6, and at the same time its rotating shaft transfers the remaining power from the engine 1 to the driving shaft 8. As indicated by the arrow in FIG. 15, the engine 1 starts, and a part of the power thereof is transferred to the driving shaft 8 through the rotating shaft of the first motor 2, and the other part of the power is converted into electrical energy by the first motor 2 and stored in the battery 6.

Figure 16:
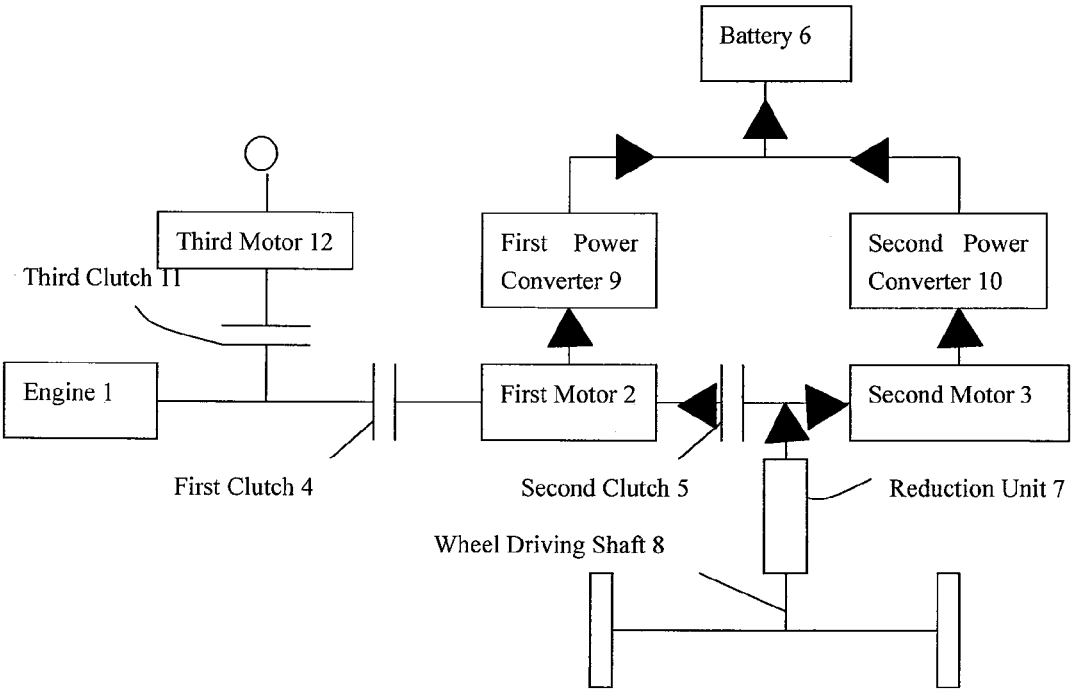
FIG. 16 and FIG. 17 are views illustrating various energy recover modes of the present hybrid power output system.
Figure 17:
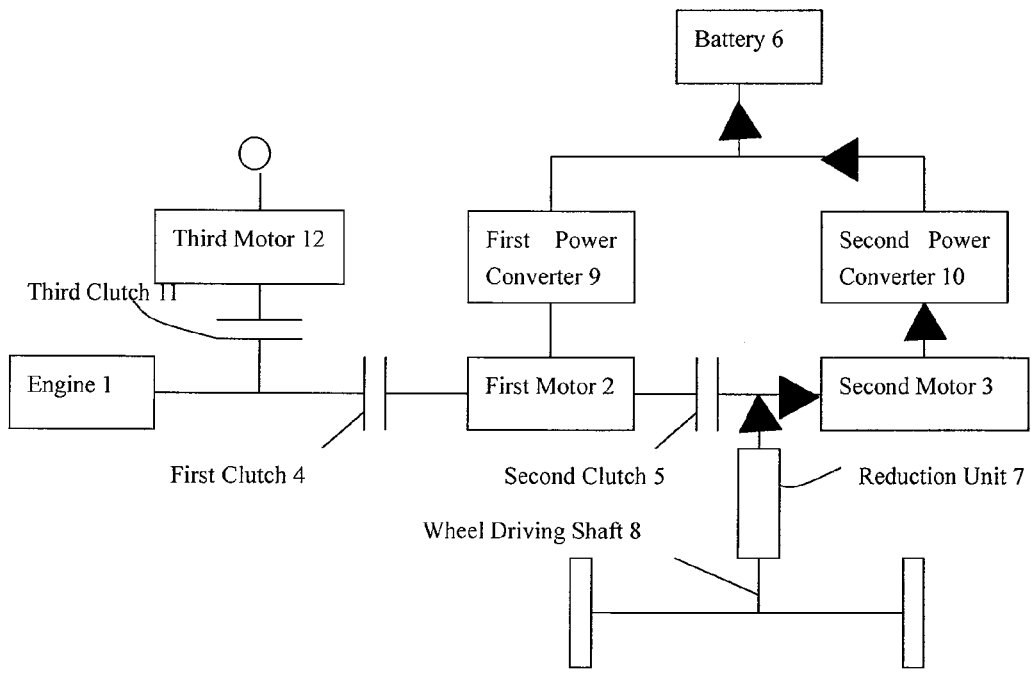

FIG. 16 and FIG. 17 are views illustrating the energy recover operation mode of the present invention.

When the vehicle is decelerating or braking, the present invention can be used to recover energy. In this mode, the motor works in electricity generating mode, and transfers the power feedback from the driving shaft 8 into the electrical energy for charging the battery 6. According to the engaged/ disengaged status of the second clutch 5, the energy may be recovered in different manners.

FIG. 16 shows the energy recover mode in which the second clutch 5 is engaged. In this mode, the rotating shafts of both the first motor 2 and the second motor 3 are connected with the driving shaft 8, and the first motor 2 and the second motor 3 are working under the electricity generating mode, for storing the recovered electricity to the battery 6. As indicated by the arrow in FIG. 16, the driving shaft 8 feedbacks the mechanical energy from the wheels to the first motor 2 and the second motor 3, and the latter is operated to convert the mechanical energy into electrical energy for charging the battery 6 to realize the energy recover purpose.

FIG. 17 shows the energy recover mode in which the second clutch 5 is disengaged. In this mode, the rotating shaft of the second motor 3 is connected with the driving shaft 8, the second motor 3 is working under the electricity generating mode, for storing the recovered electrical energy to the battery 6. As indicated by the arrow in FIG. 17, the driving shaft feedbacks the mechanical energy from the wheels to the second motor 3, and the second motor 3 converts the mechanical energy into the electrical energy for charging the battery 6 to realize the energy recover purpose.

Figure 18:
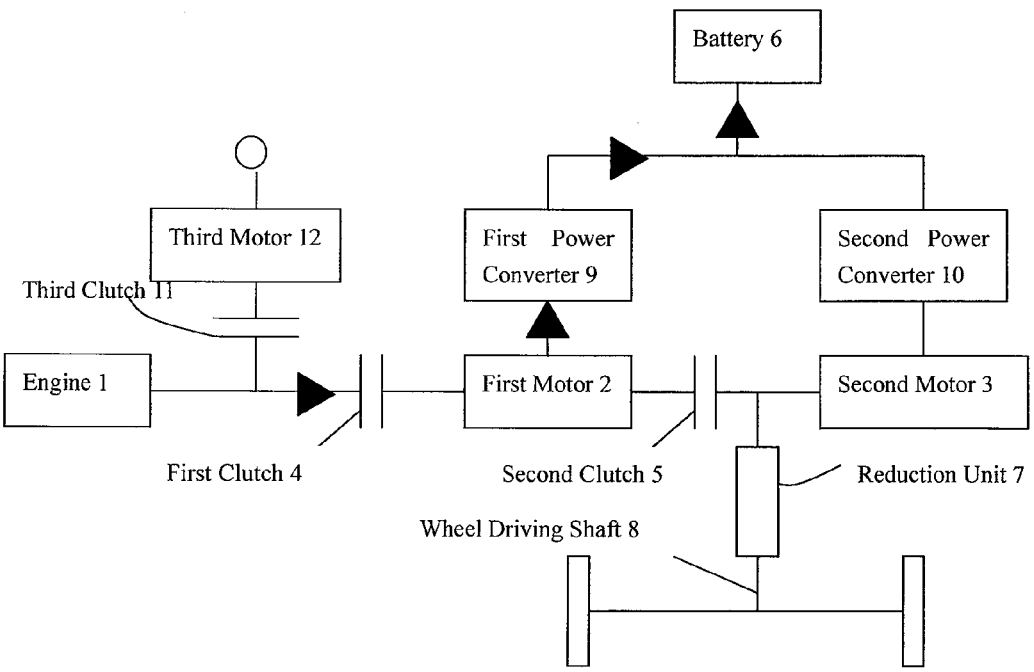
FIG. 18 is a view illustrating the state in which the present hybrid power output system is used for charging the battery when the vehicle is parking.

FIG. 18 is a view illustrating the operation mode in which the battery is charging while the vehicle is parking.

In this mode, the first clutch 4 is engaged, the second clutch 5 is disengaged and the second motor 3 is idle, the engine 1 drives the first motor 2 to work under the electricity generation mode, and stores the electrical energy into the battery 6. As indicated by the arrow in FIG. 18, the engine 1 starts to drive the first motor 2, and the first motor 2 is driven to convert the power from the engine 1 into the electrical energy for charging the battery 6.

Figure 19:
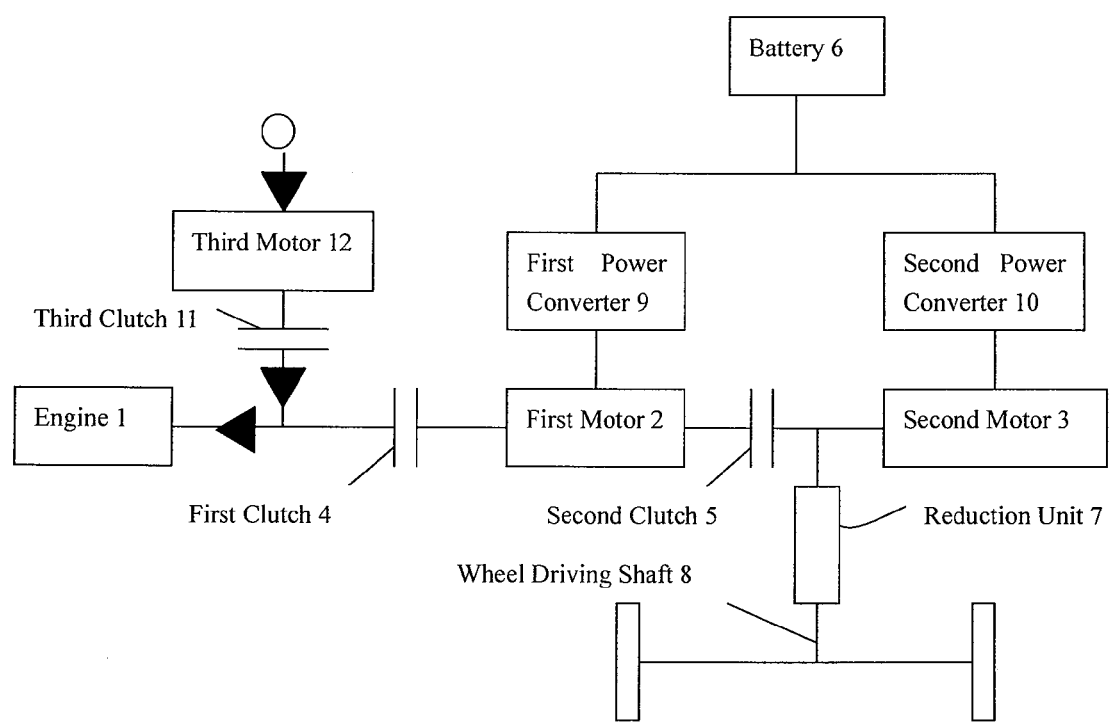
FIG. 19 is a view illustrating the state in which the present hybrid power output system is used for starting the engine.

FIG. 19 is a view illustrating the operation mode in which the engine is started.

In this mode, the third clutch 11 is engaged, and the third motor 12 is operated to drive the output shaft of the engine 1 so as to start the engine 1. at this time, the third motor 12 can be connected electrically with the secondary battery 14 or the power battery 6 for receiving electrical energy from the battery 14 or 6. As indicated by the arrow in FIG. 19, the secondary battery 14 or the power battery 6 provides electricity for the third motor 12, and the latter drives the engine 1 to start the engine 1.

Although the invention has been described with respect to specific embodiments, the details are not to be construed as limitations, for it will become apparent that various embodiments, changes and modifications may be resorted to without departing from the spirit and scope thereof, and it is understood that such equivalent embodiments are intended to be included within the scope of this invention.

The invention claimed is:

1. A hybrid power output system for a vehicle, comprising:
a first motor-generator;
a second motor-generator;
a third motor-generator;
a battery electrically connected to the first motor-generator and the second motor-generator;
the third motor-generator electrically connected to the battery or to a second battery;
an engine;
a first clutch operatively coupled between the engine and the first motor-generator;
a second clutch operatively coupled between the first motor-generator and the second motor-generator;
a third clutch operatively coupled between the engine and the third motor-generator;
a driving wheel shaft coupled to the second motor-generator and configured to receive rotational power from the second motor-generator; and
wherein the engine, the first motor-generator, the second motor-generator, and the third motor-generator are configured, when enabled, to provide rotational power to the driving wheel shaft, and wherein and the first motor-generator, the second motor-generator, and the third motor-generator are further configured to charge the battery.

2. The system of claim 1, wherein the engine, the first clutch, the first motor-generator, the second clutch, and the second motor-generator are connected in sequence in a coaxial arrangement, and wherein the third clutch and the third motor-generator are disposed on a branch located between the engine and the first clutch.

3. The system of claim 1, wherein the third motor-generator is configured as one of a driving motor-generator, a generator, or a starter motor-generator for the engine.

4. The system of claim 1, wherein the first motor-generator is a mid-speed or a high-speed motor-generator, and the second motor-generator is a mid-speed or a low-speed motor-generator.

5. The system of claim 1, wherein the first motor-generator has sufficient output power so as to propel the vehicle without engaging the second motor-generator, and the second motor-generator has sufficient output power so as to propel the vehicle without engaging the first motor-generator.

6. The system of claim 1, wherein the first motor-generator and the second motor-generator are configured to propel the vehicle simultaneously.

7. The system of claim 1, wherein an output power of the second motor-generator is greater than an output power of the first motor-generator, and wherein an output power of the third motor-generator is less than an output power of the first motor-generator.

8. The system of claim 1, further including a constant-mesh fixed ratio reduction unit configured to operatively couple the second motor-generator to a wheel driving shaft.

9. The system of claim 8, wherein the fixed ratio reduction unit is a constant-mesh gear-drive reduction unit, a constant-mesh chain-drive reduction unit or a constant-mesh friction-drive reduction unit.

10. A hybrid power output system, comprising
a first motor-generator;
a second motor-generator;
a third motor-generator;
a battery electrically connected to the first motor-generator and the second motor-generator;
the third motor-generator electrically connected to the battery or to a second battery;
an engine;
a first clutch operatively coupled between the engine and the first motor-generator;
a second clutch operatively coupled between the first motor-generator and the second motor-generator;

a third clutch operatively coupled between the engine and the third motor-generator;

wherein the third motor-generator is configured as one of a driving motor-generator, a generator, or as a starter motor-generator for the engine, and wherein the engine, the first motor-generator, the second motor-generator, and the third motor-generator are configured, when enabled, to provide power output, and wherein and the first motor-generator, the second motor-generator, and the third motor-generator are further configured to charge the battery.

11. The system of as claimed in claim 10, further including a constant-mesh fixed ratio reduction unit configured to operatively couple the second motor-generator to a wheel driving shaft.

12. The system of claim 11, wherein the fixed ratio reduction unit is a constant-mesh gear-drive reduction unit, a constant-mesh chain-drive reduction unit, or a constant-mesh friction-drive reduction unit.

13. The system of claim 10, wherein the engine, the first clutch, the first motor-generator, the second clutch, and the second motor-generator are connected in sequence in a coaxial arrangement.

14. The system of claim 10, wherein the first motor-generator has sufficient output power so as to propel the vehicle without engaging the second motor-generator, and the second motor-generator has sufficient output power so as to propel the vehicle without engaging the first motor-generator.

15. The system of claim 10, wherein the first motor-generator and the second motor-generator are configured to propel the vehicle simultaneously.

16. The system of claim 10, wherein an output power of the second motor-generator is greater than an output power of the first motor-generator, and wherein an output power of the third motor-generator is less than an output power of the first motor-generator.

17. A hybrid power output system for a vehicle, comprising:
a first motor-generator;
a second motor-generator;
a third motor-generator;
a battery electrically connected to the first motor-generator and the second motor-generator;
the third motor-generator electrically connected to the battery or to a second battery;
an engine;
a first clutch operatively coupled between the engine and the first motor-generator;
a second clutch operatively coupled between the first motor-generator and the second motor-generator;
a third clutch operatively coupled between the engine and the third motor-generator;
wherein the first motor-generator is a mid-speed or a high-speed motor-generator, and the second motor-generator is a mid-speed or a low-speed motor-generator;
wherein the third motor-generator is configured as one of a driving motor-generator, a generator, or as a starter motor-generator for the engine; and
wherein the engine, the first motor-generator, the second motor-generator, and the third motor-generator are configured, when enabled, to provide power output, and wherein and the first motor-generator, the second motor-generator, and the third motor-generator are further configured to charge the battery.

18. The system of claim 17, wherein the engine, the first clutch, the first motor-generator, the second clutch, and the second motor-generator are connected in sequence in a coaxial arrangement.

19. The system of claim 17, wherein the first motor-generator has sufficient output power so as to propel the vehicle without engaging the second motor-generator, and the second motor-generator has sufficient output power so as to propel the vehicle without engaging the first motor-generator.

* * * * *